(12) United States Patent
Harris et al.

(10) Patent No.: US 11,645,528 B2
(45) Date of Patent: *May 9, 2023

(54) CONTINUOUS LEARNING NEURAL NETWORK SYSTEM USING ROLLING WINDOW

(71) Applicant: Visa International Service Association, San Francisco, CA (US)

(72) Inventors: Theodore Harris, San Francisco, CA (US); Tatiana Korolevskaya, Mountain View, CA (US); Yue Li, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,661

(22) Filed: Sep. 14, 2022

(65) Prior Publication Data

US 2023/0004808 A1 Jan. 5, 2023

Related U.S. Application Data

(63) Continuation of application No. 16/577,047, filed on Sep. 20, 2019, now Pat. No. 11,481,622.

(60) Provisional application No. 62/734,149, filed on Sep. 20, 2018.

(51) Int. Cl.
*G06N 3/08* (2023.01)
*H04L 9/40* (2022.01)
*G06N 3/04* (2023.01)

(52) U.S. Cl.
CPC .............. *G06N 3/08* (2013.01); *G06N 3/04* (2013.01); *H04L 63/1433* (2013.01)

(58) Field of Classification Search
CPC .......... G06N 3/08; G06N 3/04; H04L 63/1433
See application file for complete search history.

(56) References Cited

U.S. PATENT DOCUMENTS

| 9,137,033 | B2 * | 9/2015 | Ogielski | H04L 43/065 |
| 9,919,217 | B2 * | 3/2018 | Aghdaie | G06Q 30/02 |
| 9,930,180 | B1 * | 3/2018 | Kan | H04M 3/5232 |
| 10,032,180 | B1 * | 7/2018 | Shariff | G06F 16/00 |

(Continued)

OTHER PUBLICATIONS

U.S. Appl. No. 16/577,047, "Notice of Allowance", dated Jul. 25, 2022, 16 pages.

(Continued)

*Primary Examiner* — Viral S Lakhia
(74) *Attorney, Agent, or Firm* — Kilpatrick Townsend & Stockton LLP

(57) ABSTRACT

A disclosed method an analysis computer determining a rolling window associated with interaction data for interactions that occur over time. The analysis computer can retrieve interaction data for interactions occurring in the rolling window. The analysis computer can then generate pseudo interaction data based upon historical interaction data. The analysis computer can optionally embed the interaction data for the interactions occurring within the rolling window and the pseudo interaction data to form interaction data matrices. The analysis computer can then form a neural network model using the interaction data matrices, which is derived from the interaction data in the rolling window and the pseudo interaction data.

18 Claims, 6 Drawing Sheets

(56) References Cited

U.S. PATENT DOCUMENTS

| | | | |
|---|---|---|---|
| 10,290,040 B1* | 5/2019 | Misra | G06N 3/04 |
| 10,346,762 B2* | 7/2019 | Greenspan | G06F 16/2465 |
| 10,409,367 B2* | 9/2019 | Velez-Rojas | G06Q 50/01 |
| 10,484,406 B2* | 11/2019 | Vasseur | H04L 63/1416 |
| 2012/0284213 A1 | 11/2012 | Lin et al. | |
| 2017/0103340 A1 | 4/2017 | Zoldi et al. | |
| 2017/0214708 A1* | 7/2017 | Gukal | H04L 63/1408 |
| 2018/0246797 A1 | 8/2018 | Modi et al. | |
| 2019/0286461 A1* | 9/2019 | Toksos | G06F 11/3438 |
| 2019/0362222 A1* | 11/2019 | Chen | G06F 11/3457 |
| 2020/0202272 A1 | 6/2020 | Aravamudhan et al. | |
| 2021/0397940 A1* | 12/2021 | Schneider | G06N 3/049 |
| 2022/0358366 A1* | 11/2022 | Lee | G06F 16/9535 |

OTHER PUBLICATIONS

Alon et al., "code2vec: Learning Distributed Representations of Code", Available Online at https://!arxiv.orglpdf/1!.103.09473.pdf, Oct. 30, 2018, pp. 1-30.

Angles et al., "Survey of Graph Database Models", ACM Computing Surveys, vol. 40, No. 1, Article 1, Feb. 2008, pp. 1-39.

Cohen et al., "Info-fuzzy Algorithms For Mining Dynamic Data Stream", Applied Soft Computing, vol. 8, No. 4, 2008, pp. 1283-1294.

EP19197802.2 , "Extended European Search Report", dated Feb. 13, 2020, 10 pages.

EP19197802.2 , "Office Action", dated Nov. 15, 2021, 10 pages.

FORTUNATO , "Community Detection in Graphs", Physics Reports, vol. 486, No. 3-5, Feb. 2010, pp. 1-103.

Hammami et al., "On-Line Self-Adaptive Framework for Tailoring a Neural-Agent Learning Model Addressing Dynamic Real-time Scheduling Problem", Journal of Manufacturing Systems, vol. 45, 2017, pp. 97-108.

Saurav et al., "Online Anomaly Detection with Concept Drift Adaptation using Recurrent Neural Networks", Proceedings of the ACM India Joint International Conference on Data Science and Management of Data, Jan. 2018, pp. 78-87.

Yang et al., "Neighbor-Based Pattern Detection for Windows Over Streaming Data", EDBT: Proceedings of the 12th International Conference on Extending Database Technology, Advances in Database Technology, Mar. 2009, pp. 529-540.

* cited by examiner

CONTINUOUS LEARNING NEURAL NETWORK SYSTEM USING ROLLING WINDOW

CROSS-REFERENCE TO RELATED APPLICATIONS

This application is a continuation of U.S. patent application Ser. No. 16/577,047, filed on Sep. 20, 2019, which is a non-provisional application of U.S. Patent Application No. 62/734,149, filed on Sep. 20, 2018, which are all herein incorporated by reference in their entirety.

BACKGROUND

Network attacks are becoming increasing dynamic and automated. Network attacks can be tracked and analyzed to predict future attacks. However, new network attacks can occur before a complete data analysis is performed using all of the previous data. While automated learning can address some issues, these models can drift over time. To combat this threat, an automated solution is needed to monitor incoming data.

Embodiments of the invention address this problem and other problems individually and collectively.

SUMMARY

One embodiment is directed to a method comprising: determining, by an analysis computer, a rolling window associated with interaction data for interactions that occur over time; retrieving, by the analysis computer, interaction data for interactions occurring in the rolling window; generating, by the analysis computer, pseudo interaction data based upon historical interaction data; and forming, by the analysis computer, a neural network model using the interaction data for interactions occurring within the rolling window and the pseudo interaction data.

Another embodiment is directed to an analysis computer comprising: a processor; a computer-readable medium coupled to the processor, the computer-readable medium comprising code executable by the processor for implementing a method comprising: determining a rolling window associated with interaction data for interactions that occur over time; retrieving interaction data for interactions occurring in the rolling window; generating pseudo interaction data based upon historical interaction data; and forming a neural network model using the interaction data for interactions occurring within the rolling window and the pseudo interaction data the interaction data matrices.

Further details regarding embodiments of the invention can be found in the Detailed Description and the Figures.

DETAILED DESCRIPTION

Figure 1:
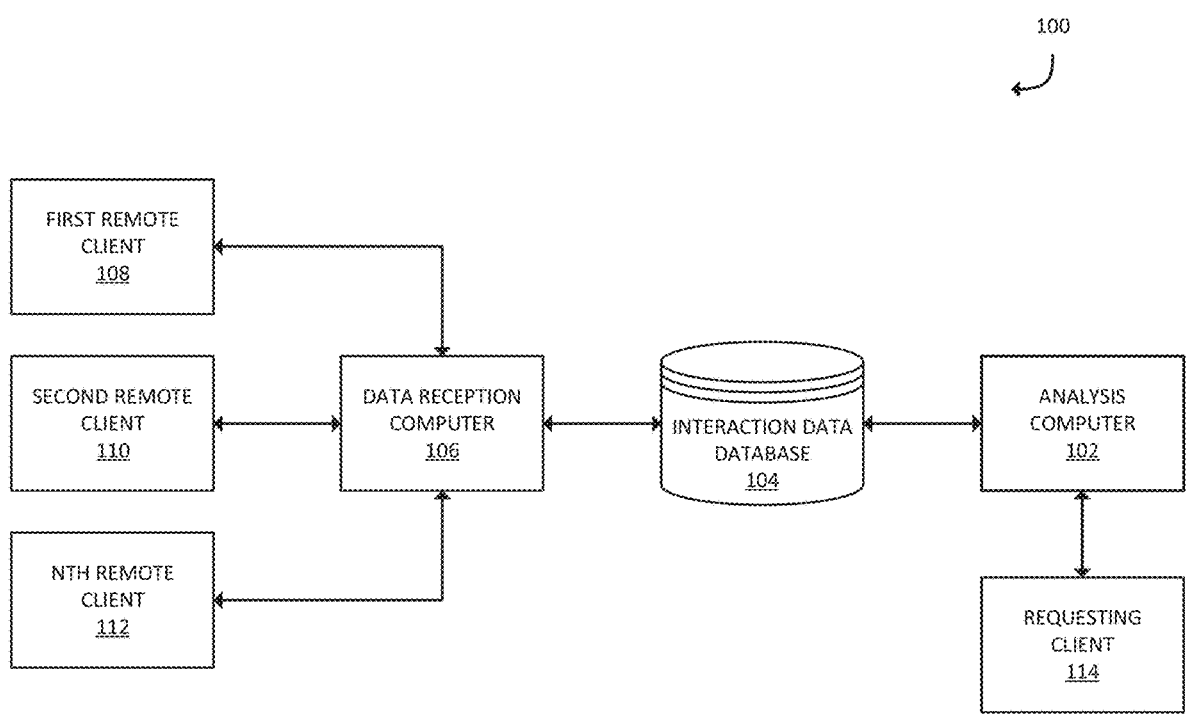
FIG. 1 shows an example monitoring system according to embodiments.

Prior to discussing embodiments, some terms can be described in further detail.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs. In some embodiments, a neural network can include a convolutional neural network, a recurrent neural network, etc.

A "model database" may include a database that can store machine learning models. Machine learning models can be stored in a model database in a variety of forms, such as collections of parameters or other values defining the machine learning model. Models in a model database may be stored in association with keywords that communicate some aspect of the model. For example, a model used to evaluate news articles may be stored in a model database in association with the keywords "news," "propaganda," and "information." A server computer can access a model database and retrieve models from the model database, modify models in the model database, delete models from the model database, or add new models to the model database.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "rolling window" can include a range of time. In some embodiments, a rolling window can include a range of time during which data (e.g., interaction data) may occur. For example, a rolling window may include a range of the past hour, day, week, month, etc. In some embodiments, a rolling window can include a start time and an end time. In other embodiments, a rolling window may include a range of a predetermined number of data. For example, a first rolling window may include the first 500 data items, a second rolling window may include data items 501 to 1000, etc.

An "interaction" may include a reciprocal action or influence. An interaction can include a communication, contact, or exchange between parties, devices, and/or entities. An example interaction can include a login attempt by a device to a secure webpage hosted by a server computer. Additional example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data associated with an interaction. Interaction data can include any suitable data representative of and/or associated with an interaction. In some embodiments, interaction data for interactions that occur over time can comprise timestamps and entity identifiers (e.g., user identifiers, IP addresses, etc.). An example of interaction data can be webpage login attempt data. In some embodiments, the interaction data can comprise HTTP header packet data. The HTTP header packet data can include data fields of, for example, authorization, browser type, connection, date, expect, forwarded, from, host, warning, etc.

"Pseudo interaction data" can include data resembling interaction data. In some embodiments, pseudo interaction data can include similar data elements as interaction data. For example, if the interaction data includes IP address and date, then the pseudo interaction data can also include IP address and date. In some embodiments, pseudo interaction data can include historical interaction data determined to be similar to current interaction data. In other embodiments, pseudo interaction data can include generated interaction data.

"Historical interaction data" can include past interaction data. For example, interaction data not included within a current rolling window (e.g., with timestamps prior to a start time of the rolling window) can be historical interaction data.

A "topological graph" can include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight," that may be assigned to the pairwise connection between the two nodes. The edge weight may be identified as a strength of connectivity between two nodes and/or may be related to a cost or distance, as it often represents a quantity that is required to move from one node to the next.

A "subgraph" or "sub-graph" can include a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

A "community" can include a group of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

The term "node" can include a discrete data point representing specified information. Nodes may be connected to one another in a topological graph by edges, which may be assigned a value known as an edge weight in order to describe the connection strength between the two nodes. For example, a first node may be a data point representing a first device in a network, and the first node may be connected in a graph to a second node representing a second device in the network. The connection strength may be defined by an edge weight corresponding to how quickly and easily information may be transmitted between the two nodes. An edge weight may also be used to express a cost or a distance required to move from one state or node to the next. For example, a first node may be a data point representing a first position of a machine, and the first node may be connected in a graph to a second node for a second position of the machine. The edge weight may be the energy required to move from the first position to the second position.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Embodiments may allow for continuous learning and rebuilding of machine learning model(s). An analysis computer can determine a rolling window associated with interaction data for interactions that occur over time. After determining the rolling window, the analysis computer can retrieve interaction data for interactions occurring in the rolling window. The analysis computer can then generate pseudo interaction data based upon historical interaction data, and then embed the interaction data for the interactions occurring within the rolling window and the pseudo interaction data to form interaction data matrices. The analysis computer can then form a neural network model using the interaction data matrices.

As an illustrative example, the interaction data can include login attempts (e.g., attempts to login to a secure webpage). The analysis computer can determine a rolling window of 1 week in length and then retrieve data relating to the login attempts which occurred within the 1 week. The analysis computer can also retrieve data relating to previous login attempts (e.g., historical interaction data) which may have occurred prior to the rolling window. The previous login attempts may have occurred in the past 2 months, 6 months, 1 year, etc. The analysis computer can generate data relating to pseudo login attempts, for example, based upon trends in the data relating to the previous login attempts. For example, the analysis computer may determine that previous login attempts indicate that fraudulent login attempts are typically performed at night by a particular browser type and originating from a similar location. Past login attempts associated with a trend like this can be selected for use as pseudo login attempts. However, it is understood that the analysis computer can determine any suitable trend in the previous login attempts.

After creating the pseudo login attempts, the analysis computer can optionally embed the current login attempts as well as the pseudo login attempts to form interaction data matrices which may represent the current login attempts and pseudo login attempts in a vector space. The analysis computer can then form a neural network model using the interaction data matrices. For example, the analysis computer can train a neural network that may predict whether or not a given login attempt is a fraudulent or non-fraudulent login attempt.

Utilizing the current login attempts and the pseudo login attempts when training the neural network can allow for a resulting model which has increased predictive power. For example, the pseudo login attempts can place emphasis on particular trends by introducing data relating to those trends.

This addresses the problem when a fraudster and a secure system can react to the actions of another which can lead to situation involving game theory (e.g., a situation in which there is strategic interaction between rational decision-makers). For example, a fraudster may perform fraudulent login attempts from a first geographic location. As a result the secure system may be changed such that login attempts originating from the first geographic location are scrutinized with more particularity than login attempts originating from other geographic locations. The fraudster can then change their strategy and can, for example, perform IP spoofing. The fraudster can modify the IP address such that it appears, to the secure system, that the login attempt originates from a second geographic location. Yet again, the secure system may be changed such that login attempts originating from the second geographic location are scrutinized with more particularity than from other geographic locations. However, if the models implementing these changes (e.g., determining to scrutinize the particular geographic location) analyze current data, they can stop scrutinizing the login attempts from the first geographic location. Thus, simply being reactive to what the fraudster is currently doing and may not be desirable.

Another option to address the problem above might be to use all of the historical data and all data within a current rolling window (e.g., current interaction data). However, using all of the historical interaction data and the current interaction data to train a neural network can take a long time since large amounts of data need to be processed. If the neural network takes too long to train, then it cannot react to, for example, network attacks which can occur on much smaller timescales.

I. Systems

FIG. 1 shows a monitoring system 100, comprising an analysis computer 102, an interaction data database 104, a data reception computer 106, a plurality of remote clients 108-112, and a requesting client 114. The analysis computer 102 may be in operative communication with the interaction data database 104 and the requesting client 114. The interaction data database 104 may be in operative communication with the data reception computer 106. The data reception computer 106 may be in operative communication with the plurality of remote clients 108-112.

The components of the monitoring system 100 can communicate with one another via any appropriate means, including a communications network. Messages and other communications may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL) and/or the like.

For simplicity of illustration, a certain number of components are shown in FIG. 1. It is understood, however, that embodiments of the invention may include more than one of each component.

The plurality of remote clients 108-112 can include the first remote client 108, the second remote client 110, and the Nth remote client 112. A remote client can include any suitable device (e.g., personal computers, server computers, laptop computers, smart phones, etc.). A remote client, such as first remote client 108, can perform an interaction with the data reception computer 106. For example, the data reception computer 106 may host a secure webpage. The remote client can attempt to login to the secure webpage (e.g., interact with the data reception computer 106). In some embodiments, the login attempt may be a successful login attempt, a fraudulent login attempt, a failed login attempt, etc.

The data reception computer 106 can be configured or programmed to store the interaction data in the interaction data database 104. The data reception computer 106 can receive data from the remote client. For example, the data reception computer 106 can receive an HTTP header packet and/or any other suitable data associated with a login attempt. The data reception computer 106 can store the interaction data (e.g., the HTTP header packet) in the interaction data database 104. In some embodiments, the data reception computer 106 can forward the interaction data to an intermediate computer which may store the interaction data in the interaction data database 104.

The interaction data database 104 can include any suitable database. The database may be a conventional, fault tolerant, relational, scalable, secure database such as those commercially available from Oracle™ or Sybase™, or in some embodiments, from other open source alternatives (e.g., MySQL, etc.). The interaction data database 104 can store interaction data.

The analysis computer 102 can be configured or programmed to analyze interaction data. For example, in some embodiments, the analysis computer 102 can determine a rolling window associated with interaction data for interactions that occur over time. The analysis computer 102 can retrieve interaction data occurring in the rolling window from the interaction data database 104. The analysis computer 102 can also generate pseudo interaction data based upon historical interaction data. In some embodiments, the analysis computer 102 can generate the pseudo interaction data based on one or more data trends in the historical interaction data. The one or more trends can be determined in any suitable matter as described herein. For example, the analysis computer 102 can cluster the historical interaction data based on similarities between the interactions represented as the historical interaction data into community groups. As an illustrative example, where the interaction data may include login attempts, the historical interaction data can be clustered into an IP address spoofing community (which may include login attempts performed by spoofed IP address), an authentic community (which may include authentic login attempts), a network attack community (which may include login attempts performed by a network of devices against a secure webpage), etc.

The analysis computer 102 can also embed the interaction data for the interactions occurring within the rolling window as well as the pseudo interaction data to form interaction data matrices. The analysis computer 102 can then form a neural network model using the interaction data matrices.

In some embodiments, the analysis computer 102 can store the neural network model in a model database. At any suitable time thereafter, the analysis computer 102 can receive a request message comprising request data from the requesting client 114. In some embodiments, the request message can include, for example, a request for the analysis computer 102 to perform an analysis on the request data comprising interaction data. In other embodiments, the request message can request a prediction from the analysis computer 102. The requesting client 114 can include any suitable computer which can be configured to request information from the analysis computer 102.

The analysis computer 102 can determine a response message to the request message. The response message can comprise response data output by the neural network model based on the request data. The analysis computer 102 can then provide the response message to the requesting client 114.

Figure 2:
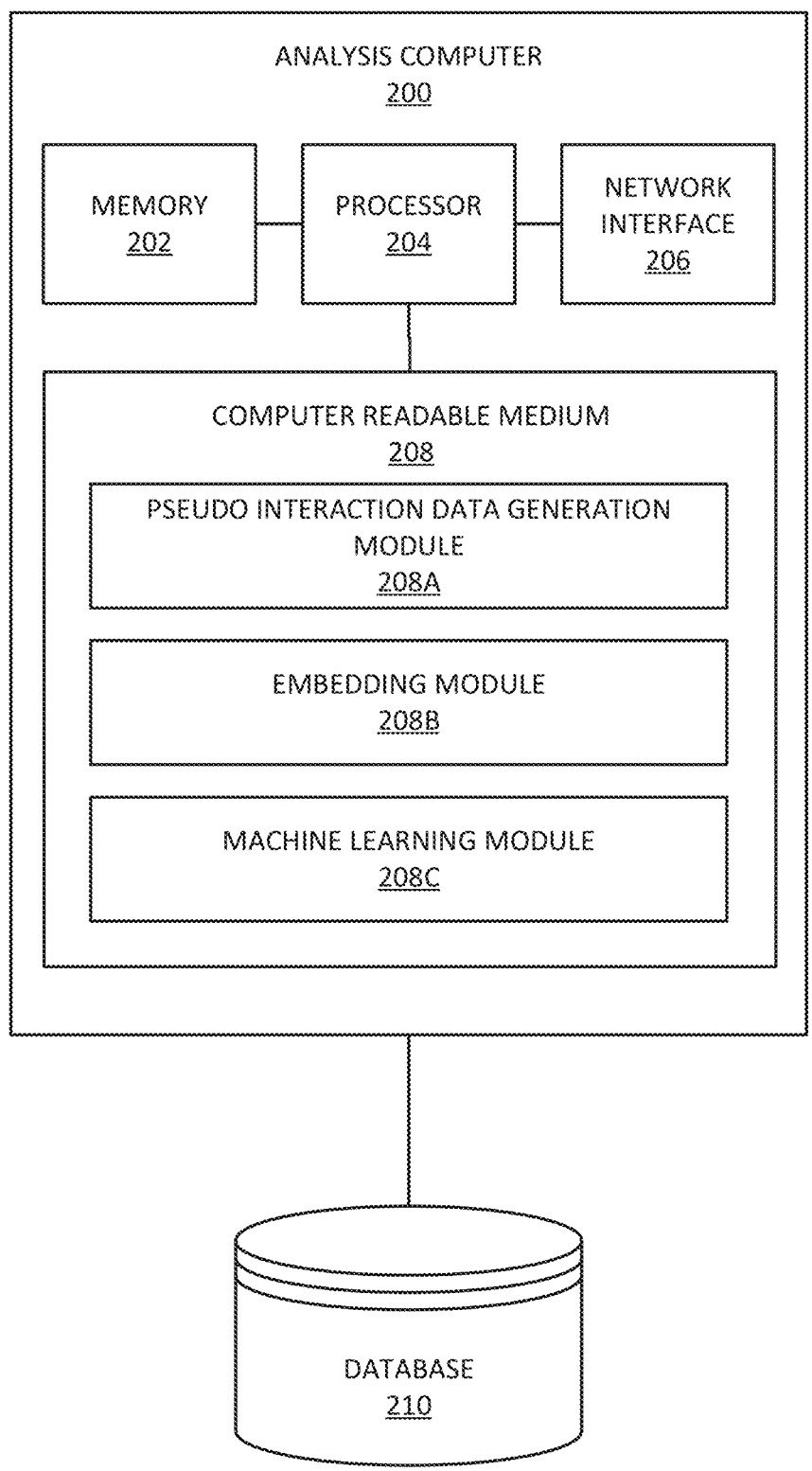
FIG. 2 shows an example block diagram of an analysis computer according to some embodiments.

FIG. 2 shows a block diagram of an exemplary analysis computer 200 according to some embodiments. The analysis computer 200 may comprise a memory 202, a processor 204, a network interface 206, and a computer readable medium 208. The computer readable medium 208 may comprise a number of software modules. The computer readable medium 208 can comprise a pseudo interaction data generation module 208A, an embedding module 208B, and a machine learning module 208C. However, it is understood that the computer can comprise any other suitable modules (e.g., a database communication module, a rolling window determination module, etc.).

The analysis computer 200 can be in operative communication with an interaction data database 210. The interaction data database 210 can be similar to the interaction data database 104, and the details thereof need not be repeated here.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, interaction data, weight values, etc.

The computer readable medium 208 may comprise code, executable by the processor 204, for performing a method comprising: determining, by an analysis computer, a rolling window associated with interaction data for interactions that occur over time; retrieving, by the analysis computer, interaction data for interactions occurring in the rolling window; generating, by the analysis computer, pseudo interaction data based upon historical interaction data; and forming, by the analysis computer, a neural network model using the interaction data for interactions occurring within the rolling window and the pseudo interaction data.

The pseudo interaction data generation module 208A may comprise code or software, executable by the processor 204, for generating pseudo interaction data. Pseudo interaction data can include data resembling interaction data. In some embodiments, the pseudo interaction data can include similar data elements as interaction data. For example, if the interaction data includes IP address, host, time, and forwarded, then the pseudo interaction data can also include IP address, host, time, and forwarded. In other embodiments, pseudo interaction data can include historical interaction data determined to be similar to current interaction data. In other embodiments, pseudo interaction data can include generated interaction data. The pseudo interaction data generation module 208A, in conjunction with the processor 204, can generate the pseudo interaction data in any suitable manner based on historical interaction data stored in the interaction data database 210.

For example, the pseudo interaction data generation module 208A, in conjunction with the processor 204, can determine one or more data trends in the historical interaction data. The one or more trends can be determined in any suitable matter as described herein. For example, the analysis computer 200 can perform a learning process using the historical interaction data. The analysis computer 200 can, for example, cluster the historical interaction data based on similarities between the interactions represented as the historical interaction data into community groups. Further details regarding clustering of data into community groups are described in [Fortunato, Santo. "Community detection in graphs." Physics reports 486.3-5 (2010): 75-174.] which is herein incorporated by reference. The pseudo interaction data generation module 208A, in conjunction with the processor 204, can generate a plurality of pseudo interactions based on the one or more data trends (e.g., identified in the community groups) to form pseudo interaction data.

In some embodiments, the plurality of pseudo interactions can include historical interactions determined to be within a threshold amount of similarity of the current interaction data (e.g., the interaction data occurring within the rolling window). In other embodiments, the plurality of pseudo interactions can include similar data elements (e.g., IP address, hosts, forwarded, etc.) as historical interactions determined to be within a threshold amount of similarity to the current interaction data. Further details regarding generating pseudo interaction data according to some embodiments are discussed herein in reference to FIG. 6.

The embedding module 208B may comprise code or software, executable by the processor 204, for embedding interaction data and the pseudo interaction data. In some embodiments, embedding can include transforming input data to output data while maintaining the underlying meaning of the input data in relation to other input data. The embedding module 208B, in conjunction with the processor 204, can perform an embedding process (e.g., embed) in any suitable manner. The embedding module 208B, in conjunction with the processor 204, can map discrete and/or categorical variables to a vector, or matrix, of continuous numbers. In some embodiments, the result of an embedding process (e.g., embedded interaction data and pseudo interaction data) may be referred to as an embedding. The embedding can be a low-dimensional, learned continuous vector representation(s). To construct representations of the interaction data and the pseudo interaction data, the embedding module 208B, in conjunction with the processor 204, can utilize an embedding neural network and a supervised task to learn the embedding(s). In some embodiments, the individual dimensions in these resulting matrices (e.g., interaction data matrices) from the embedding process typically may have no inherent meaning. Instead, the analysis computer 200 can take advantage of the overall patterns of location and distance between vectors.

As an example, if one has input data (e.g., input to the embedding module 208B) that includes 50,000 words used in a collection of movie reviews, the embedding module 208B, in conjunction with the processor 204, could learn 100-dimensional embeddings for each word using an embedding neural network trained to predict the sentimentality of the reviews. Words in the vocabulary that are associated with positive reviews such as "brilliant" or "excellent" can come out closer in the embedding space because the neural network has learned these are both associated with positive reviews.

The embeddings determined by the embedding module 208B, in conjunction with the processor 204, can be the parameters, or weights, of the neural network that are adjusted during training to minimize the loss on the supervised task. Although in a supervised machine learning task the goal is usually to train a model to make predictions on new data, in this embedding model, the predictions may not be further used. The embedding module 208B, in conjunction with the processor 204, can determine the embedding weights (e.g., the representation of the interaction data and pseudo interaction data as continuous vectors). Further details regarding embedding can be found in [Alon, Uri, et al. "code2vec: Learning distributed representations of code." *Proceedings of the ACM on Programming Languages* 3.POPL (2019): 40.] where embeddings of code snippets are determined, which is herein incorporated by reference.

The machine learning module 208C may comprise code or software, executable by the processor 204, for training machine learning models (e.g., neural network models). In some embodiments, the machine learning module 208C can contain code that defines a machine learning model, as well as code that can enable the processor 204 to train the machine learning model. The trained machine learning model can accept feature inputs and determine an output (e.g., a classification, prediction, etc.) for each input vector. The machine learning module 208C, in conjunction with the processor 204, may use suitable machine learning models based on algorithms including, but not limited to: neural networks, decision trees, support vector methods, and K-means algorithms.

For example, the machine learning module 208C, in conjunction with the processor 204, can build a mathematical model based on sample data, known as "training data," to make predictions or decisions without being explicitly programmed to perform the task. In some embodiments, the machine learning module 208C, in conjunction with the processor 204, can train a neural network. A neural network can be a model based on a collection of connected units or nodes called artificial neurons. Each connection (e.g., edge) can transmit information (e.g., a signal) from node to another. A node that receives a signal can process it and then signal additional nodes connected to it. In some embodiments, the signal at a connection between nodes can include a real number, and the output of each node can be computed by some non-linear function of the sum of its inputs. Nodes and edges can have a weight that adjusts as learning proceeds. The weight may increase or decrease the strength of the signal at an edge. In some embodiments, nodes may have a threshold such that the signal is only sent if the aggregate signal crosses that threshold. Different layers of the neural network may perform different kinds of transformations on their inputs. Further, signals can travel from the first layer (e.g., the input layer), to the last layer (e.g., the output layer), possibly after traversing middle layer(s) (e.g., hidden layer(s)). In some embodiments, the machine learning module 208C, in conjunction with the processor 204, can train a neural network as described in reference to FIG. 3.

The network interface 206 may include an interface that can allow the analysis computer 200 to communicate with external computers. The network interface 206 may enable the analysis computer 200 to communicate data to and from another device (e.g., a requesting client, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

II. Methods

Figure 3:
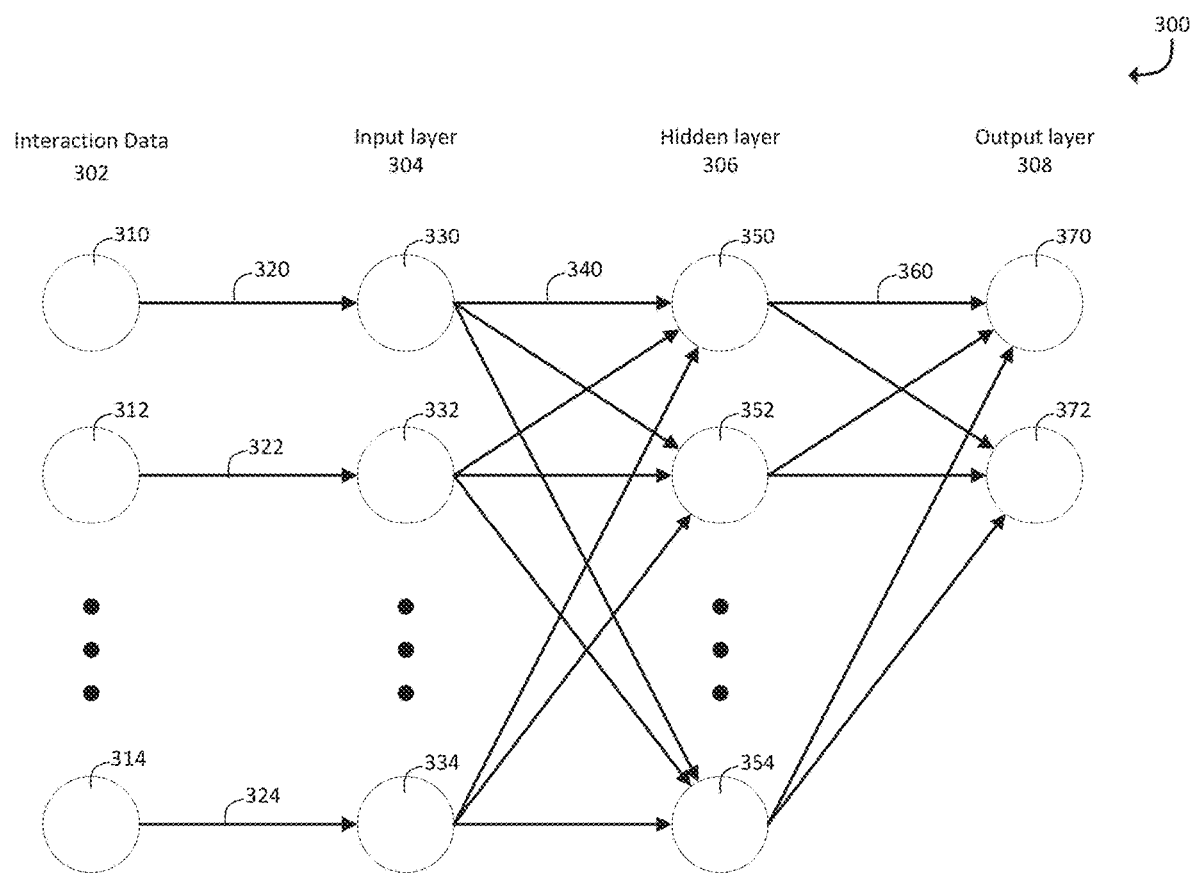
FIG. 3 shows an example diagram illustrating a learning process according to embodiments.
Figure 4:
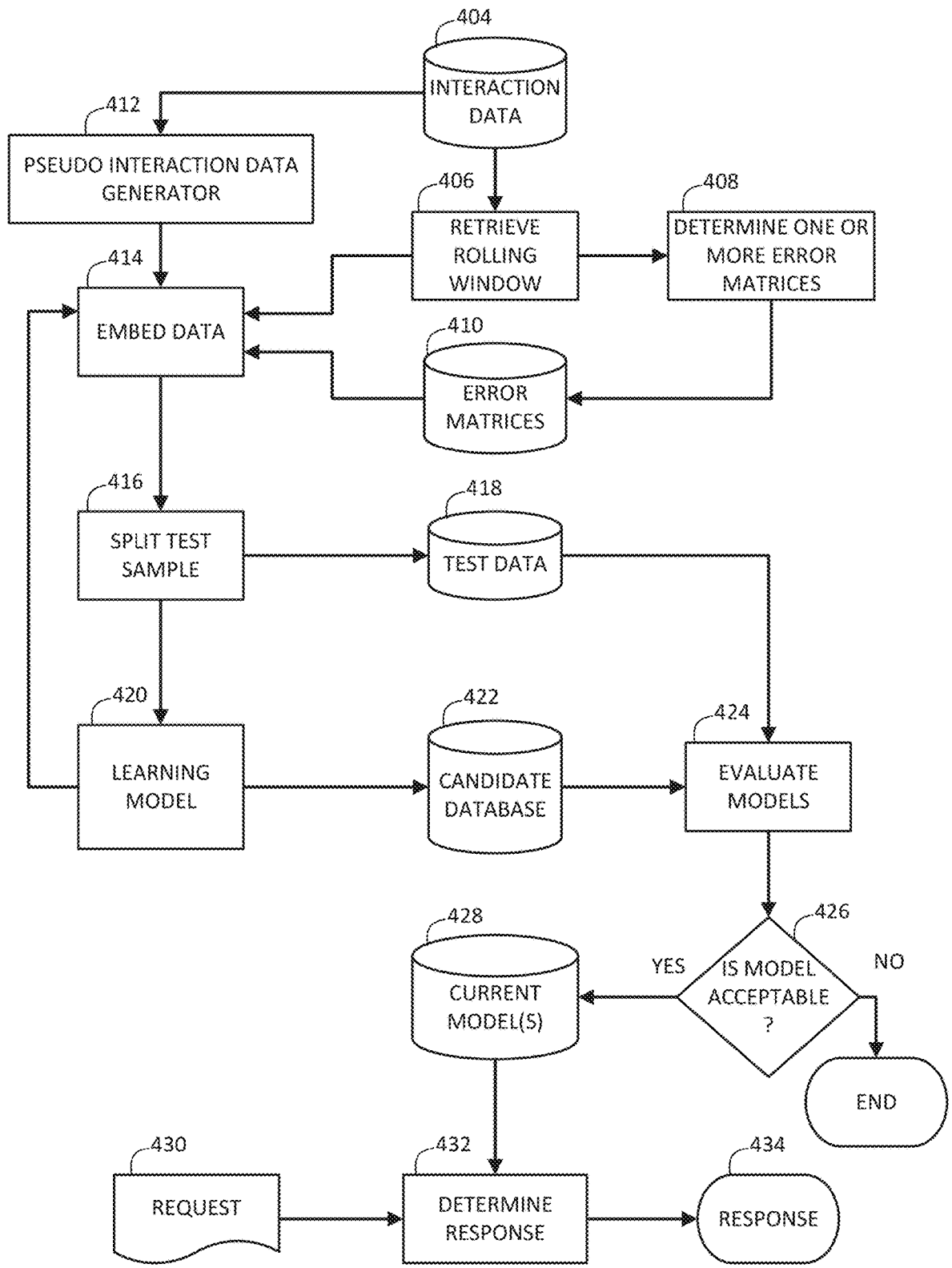
FIG. 4 shows an example flowchart of a monitoring method according to embodiments.

Embodiments can use the systems and apparatuses described herein to at least create a machine learning model based on interaction data. FIGS. 3-4 describe some examples of such methods. In some embodiments, the analysis computer may include the analysis computer 102 or the analysis computer 200 of FIGS. 1 and 2, respectively.

According to some embodiments, the analysis computer can continuously rebuild deep learning models based on dynamic embedding of interaction data including, for example, HTTP header packets. In some embodiments, the analysis computer can create an AI system that can learn in real-time. Previous machine learning models (e.g., deep learners, etc.) may have problems processing the interaction data since the data can come from many different distributions and populations. A traditional neural network that evaluates different distributions in real-time can overfit the data. In some embodiments, the analysis computer can upfront some of the smoothing of the information space (e.g., by embedding the interaction data). The analysis computer can feed embedded data (e.g., interaction data matrices) into the learner.

A. Neural Networks

The analysis computer can embed interaction data to form interaction data matrices as described herein. The analysis computer can then input the interaction data matrices into, for example, a neural network. FIG. 3 shows learning process according to some embodiments. As illustrated, the artificial neural network 300 includes a series of layers, each representing a set of nodes. For example, the node 310 can be a first element of a first vector of the interaction data 302 (e.g., a vector including the data elements of the interaction). Similarly, node 312 can be a second element of the first vector of the interaction data 302, while node 314 can be an Nth element of the first vector of the interaction data 302.

The first vector can include data associated with a first login attempt. For example, the first element of the first vector (e.g., at node 310) can include an IP address. The second element of the first vector (e.g., at node 312) can include a browser type. The Nth element of the first vector (e.g., at node 314) can include a host.

In some embodiments, the analysis computer, prior to training the neural network, can embed the input interaction data. For example, the edges 320, 322, and 324 can illustrate embedding of the interaction data. The interaction data 302 as a whole may be embedded, and the resulting vector input into the neural network at the input layer 304. The embedding process can be performed with an embedding neural network (not specifically illustrated in FIG. 3), and the embedding process is described in further detail below.

As an illustrative example, a first interaction data of the interaction data 302 can include three data elements. The three data elements can be an IP address of "123.01.02.3456," a browser type of "browser_A1," and a host of "en.example.org." The interaction data 302 can be embedded for example via an embedding neural network (e.g., a neural network which may embed data). The embedding neural network can map the elements of the input interaction data 302 to a vector of values. As noted above, the embedding neural network is not specifically illustrated in FIG. 3.

As an example, the data input into the embedding neural network can include [123.01.02.3456, browser_A1, en.example.org]. In some embodiments, the data elements of the input interaction data 302 may be split in any suitable manner, for example, via NGram. For example, the analysis computer can determine to split the above interaction data 302 into [123_01, 01_02, 02_3456, 123, 01, 02, 3456, browser_A1, browser, A1, en, example, org, en.example.org]. This data may be input into the embedding neural network. The output vector, corresponding to the input data, can be determined by the embedding neural network and can include for example [1.2, 3.4, 1.0]. In some embodiments, the output vector of [1.2, 3.4, 1.0] can be referred to as an embedding. The collection of all of the output vectors can be referred to as an interaction data matrix, as each column, or row, of the matrix may include one of the output vectors. It is understood that even though the edges 320, 322, and 324 illustrate a one-to-one connection between nodes of the interaction data 302 and the input layer 304, the embedding process may, in some embodiments, convolute the input data elements. Further details regarding embedding can be found in [Alon, Uri, et al. "code2vec: Learning distributed representations of code." *Proceedings of the ACM on Programming Languages* 3.POPL (2019): 40.] where embeddings of code snippets are determined, which is herein incorporated by reference.

In other embodiments, at the edges 320, 322, and 324, the analysis computer can re-weight the first element, the second element, and the Nth element, respectively. The analysis computer can weight the elements of the interaction data 302 in any suitable manner known to one of skill in the art. In some embodiments each vector of the interaction data 302 may be weighted individually and then individually input into the input layer 304 as shown in FIG. 3. At the edge 322, the analysis computer can re-weight the second element.

On one side of the series of layers exists an input layer 304. The input layer 304 includes a set of nodes (e.g., nodes 330, 332, and 334) that are referred to herein as input nodes. Each of these input nodes may be mapped to a particular feature of an object model or an object model itself. In some embodiments, each "feature" may actually comprise a combination of other features. For example, a feature may comprise a number of data points, a label associated with those data points (e.g., a region label), a position of the data points with respect to the rest of the object model, or any other suitable feature. For example, in some embodiments, a feature may be a result of embedding interaction data, as described herein.

On the other side of the series of layers is an output layer 308. The output layer 308 can include a number of output nodes. Each of the output nodes may be mapped to an object model associated with a particular category of object. In some embodiments, each output node may be mapped to a region of a number of regions associated with an object model provided as input. As an illustrative example, the output layer 308 can include two nodes (e.g., nodes 370-372). The node 370 can correspond to an output of "fraud," whereas the node 372 can correspond to an output of "not fraud." However, it is understood that the output layer 308 can include any suitable number of nodes (e.g., 2, 5, 10, 100, etc.).

One or more hidden layers 306 can separate the input layer 304 and the output layer 308. The set of hidden layers 306 can include "N" number of hidden layers, where "N" is an integer greater than or equal to one. In turn, each of the hidden layers can also include a set of nodes that are referred to herein as hidden nodes.

On one side of the hidden layers 306, hidden nodes (e.g., nodes 350, 352, and 354) are interconnected to the input nodes. Each of the input nodes may be connected to each of the hidden nodes of the hidden layer connected to the input layer 304. On the other side of the hidden layer 306, hidden nodes are connected to the output nodes. Each of the output nodes may be connected to each of the hidden nodes of the hidden layer connected to the output layer 308. In other words, each input node connects to each hidden node in the hidden layer closest to the input layer 304 and each output node connects to each hidden node in the hidden layer closest to the output layer 308. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison, a connection between a hidden node and an output node may represent a piece of information learned that is specific to the output node. The interconnection may be assigned a numeric weight that can be tuned (e.g., based on a training dataset), rendering the artificial neural network 300 adaptive to inputs and capable of "learning."

Generally, the hidden layer 306 allows knowledge about the input nodes of the input layer 304 to be shared amongst the output nodes of the output layer 308. To do so, an activation function $f$ can be applied to the input nodes through the hidden layer 306. In an example, the activation function $f$ may be non-linear. Different non-linear activation functions $f$ are available including, for instance, a rectifier function $f(x)=\max(0, x)$. The activation function $f$ can include any suitable activation (e.g., step function, logistic function, Tan h function, rectified linear unit (ReLU), softmax, etc.).

The artificial neural network 300 may also use one or more cost or loss functions to find an optimal solution (e.g., an optimal activation function). The optimal solution can represent the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the artificial neural network 300. Using a backpropagation algorithm, the output values are compared with a correct answer to compute the value of some predefined error-function. In some embodiments, by various techniques, the error is then fed back through the network. Using this information, the algorithm may adjust the weights of each connection in order to reduce the value of the error function by some small amount. In other embodiments, the artificial neural network 300 may be an autoencoder neural network, in which both inputs and outputs are provided to the artificial neural network during training and the autoencoder learns to reconstruct its inputs.

In the depicted artificial neural network 300, a forecasting model may be generated such that the hidden layer 306 retains information (e.g., specific variable values and/or transformative functions) for a set of input values and output values used to train the artificial neural network 300. This retained information may be applied to a new interaction data in order to identify a likelihood that the interaction data is fraudulent or not fraudulent. In some embodiments, the artificial neural network 300 may be trained on samples having known classifications (e.g., fraudulent or not fraudulent). For example, an artificial neural network 300 may be used to generate a forecasting model using inputs that include a plurality of known fraudulent input samples and known not fraudulent input samples where the results are optimized to minimize a distance between results for the fraudulent samples from a fraudulent center and maximize results for the not fraudulent samples from that center. In this example, the resulting forecasting model may be applied to raw interaction data input in order to generate a result for that interaction data input in relation to the results for the known samples.

By way of illustration, a neural network as depicted in FIG. 3 may be trained using both known fraudulent samples and not fraudulent samples as inputs. Each of the output nodes in this example may represent results positioned within a hyperspace. When a new interaction data is presented as input to the trained neural network, the neural network will output a result which can be assessed based on its position within the hyperspace.

B. Monitoring Method

FIG. 4 shows a flowchart of a monitoring method according to embodiments. The method illustrated in FIG. 4 will be described in the context of an analysis computer analyzing interaction data. The interaction data can include, for example, login attempts to a secure webpage. A login attempt may be a fraudulent login attempt or an authentic login attempt. The analysis computer can create a deep learner (e.g., a neural network) which can predict fraudulent login attempts such as, for example, fraudulent login attacks that may take place during a network attack. It is understood, however, that the method can be applied to other circumstances and use cases.

Prior to step 404, a data reception computer can receive interaction data from, for example, a remote client. For example, the data reception computer may host a secure webpage. The remote client may attempt to access the secure webpage. During the login attempt, the data reception computer can receive any suitable data associated with the login attempt. For example, the received interaction data can include data of an HTTP header packet. The HTTP header packets can contain data such as, for example, IP address, browser type, forwarded (e.g., original information of a client connecting to a web server through an HTTP proxy), host (e.g., a domain name of the server (for virtual hosting), and the TCP port number on which the server is listening. In some embodiments, the port number may be omitted if the port is the standard port for the service requested), warning (e.g., A general warning about possible problems with the entity body), etc. The interaction data can further comprise timestamps. The host header field in a request can provide the host and port information from the target URL, enabling an origin server to distinguish among resources while servicing requests for multiple host names on a single IP address. A fraudulent entity (e.g., a fraudster) may attempt to fraudulently login to the webpage. At step 404, the data reception computer can store the interaction data in an interaction data database.

At step 406, an analysis computer can determine a rolling window associated with interaction data for interactions that occur over time. The rolling window may allow the analysis computer to retrieve a particular portion of interaction data. The analysis computer can retrieve the interaction data for interactions occurring in the rolling window from the interaction data database. The rolling window may be for any suitable length of time, for example, one month, one week, one day, etc. In some embodiments, the analysis computer can also filter the interaction data that was obtained using the rolling window.

In some embodiments, at step 408, after retrieving the interaction data occurring within the rolling window, the analysis computer can determine one or more error matrices. The one or more error matrices may represent weights which may be used during an embedding process (e.g., at step 414) to embed the interaction data. The one or more error matrices may be determined, as described in further detail in FIG. 5. The one or more error matrices can indicate, for example, how much error there is in predictions created by a trained model. The one or more error matrices can be used to transform input interaction data. An error matrix which transforms the interaction data in such a way to yield a low error trained model may be an optimal error matrix, and may be stored. Embedding can include mapping a discrete variable to a vector of continuous numbers. In the context of neural networks, an embedding can include low-dimensional, learned continuous vector representations of discrete variables. Neural network embeddings can be useful because they can reduce the dimensionality of categorical variables and meaningfully represent categories in the transformed space. The analysis computer can determine an optimal embedding of the interaction data. For example, the analysis computer can perform a dynamic temporal graph embedding process.

In some embodiments, during a dynamic embedding process, the analysis computer can represent the input data (e.g., the interaction data occurring within the rolling window) as a graph including a plurality of nodes connected via edges. In some embodiments, the interaction data may already be stored as a graph. Further details regarding graph data and graph database models can be found in [Angles, Renzo, and Claudio Gutierrez. "Survey of graph database models." *ACM Computing Surveys (CSUR)* 40.1 (2008): 1.], which is herein incorporated by reference.

In some embodiments, the analysis computer can split one or more data elements of the interaction data (e.g., IP address) apart using, for example, NGram. An NGram can be a contiguous sequence of n items from a given sample of text or data. As an illustrative example, the analysis computer can receive the raw data field of "123.01.02.3456" which may be an IP address. An example, NGram of the IP address can be "123_01, 01_02, 02_3456, 123, 01, 02, 3456." The analysis computer may then determine an adjacency matrix and a degree matrix, as known to one of skill in the art. An adjacency matrix can be a square matrix which may represent a finite graph. Elements of the adjacency matrix can indicate whether pairs of vertices (e.g., nodes) are adjacent or not in the graph. A degree matrix can be a diagonal matrix which may contain information about the degree of each vertex—that is, the number of edges attached to each vertex. The adjacency matrix and the degree matrix can allow for the analysis computer to perform analysis on the graph data (e.g., interaction data).

In some embodiments, the analysis computer can then apply a transformation function to edge weights based on time and error matrices. The time matrix can include weights based on the age of the corresponding interaction. For example, the analysis computer can provide a greater weight towards more recent data. In this way, the analysis may place a greater emphasis on more recent data of the data occurring within the rolling window. The error matrix can be determined in any suitable manner. As an example, the error matrix can be determined using a simulated annealing process, which may determine an optimal solution.

Figure 5:
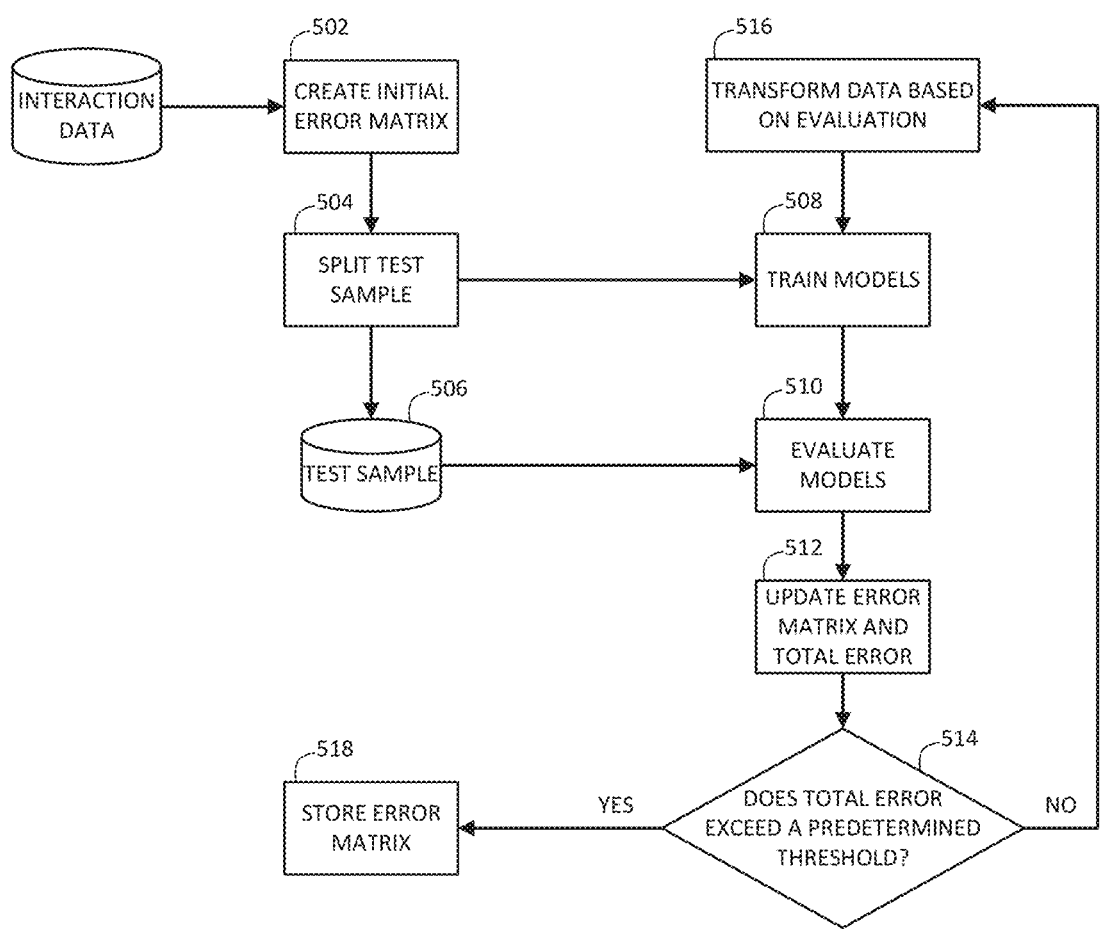
FIG. 5 shows an example flowchart illustrating a dynamic embedding determination method according to some embodiments.

The analysis computer can perform the simulated annealing process as described in further detail in FIG. 5. As an overview of FIG. 5, described in detail herein, the simulated annealing process can include an unsupervised deep learner (e.g., a restricted Boltzmann machine, etc.) which may be used to create community groups from the input data. A restricted Boltzmann machine (RBM) can be a generative stochastic artificial neural network that can learn a probability distribution over its set of inputs. The community groups may be used to create new linkage between vertices in the original graph. For example, the analysis computer can apply a transformation to the adjacency matrix. The transformation can include applying the time matrix to the adjacency matrix. The analysis computer can then create a model, for example, a gradient boosted tree, which may predict whether or not interaction data is fraudulent interaction data. The analysis computer can then evaluate the performance of the resulting model using a sample data set. The analysis computer can determine, based on the analysis of the performance, residual error values for each input interaction data. The analysis computer can also determine a total error. In some embodiments, the total error can be determined as a mean squared error (MSE). If the total error exceeds a predetermined error threshold, then the analysis computer can determine to store the error matrix. Otherwise, the analysis computer can iterate the process. For example, the analysis computer can transform the interaction data using the error matrix determined from the residual errors, the create a new model using the transformed interaction data. If MSE meets a predetermined threshold or, in some embodiments, if a max iteration is reached, then the process can end.

At steps 410, in some embodiments, the best N error matrices may be selected and stored in a database. For example, the stored error matrices may satisfy the requirements of the dynamic embedding process, described in further detail herein. The analysis computer may store the error matrices which result in neural networks which include the lowest total error. By doing so, the analysis computer can store the error matrix, which when used to transform the input interaction data can be used to train a neural network yielding a low error model. These error matrices which are the best N error matrices may be later used later during embedding of interaction data at step 414. In some embodiments, the analysis computer may also store the trained embedding neural network in association with the stored error matrix.

At step 412, the analysis computer can generate pseudo interaction data. The pseudo interaction data may allow the analysis computer to include additional interaction data representative of trends over time, beyond that of the current interaction data. In some embodiments, the pseudo interaction data can be generated by an pseudo interaction data generator. In some embodiments, the analysis computer can generate the pseudo interaction data based upon historical interaction data. In some embodiments, the analysis computer can determine one or more data trends in the historical interaction data comprising interactions that occur within and outside of the rolling window. The analysis computer can generate a plurality of pseudo interactions based on the one or more data trends to form pseudo interaction data.

In one illustration, the analysis computer can generate pseudo interaction data by determining a community group of IP addresses of historical interaction data, wherein the community group includes IP addresses typically associated with fraudulent login attempts. In this example, the trend can be that these IP addresses typically perform fraudulent login attempts. The analysis computer can then generate pseudo interaction data comprising IP addresses included in the community group. In some embodiments, the interaction data for interactions that occur over time can comprise timestamps and entity identifiers (e.g., an IP address which may identifier an entity). The analysis computer can create pseudo interaction data for pseudo interactions which comprises timestamps and entity identifiers, such that the pseudo interaction data may mimic the interaction data. For example, the analysis computer can create the pseudo interaction data with timestamps which occur within the rolling window.

Figure 6:
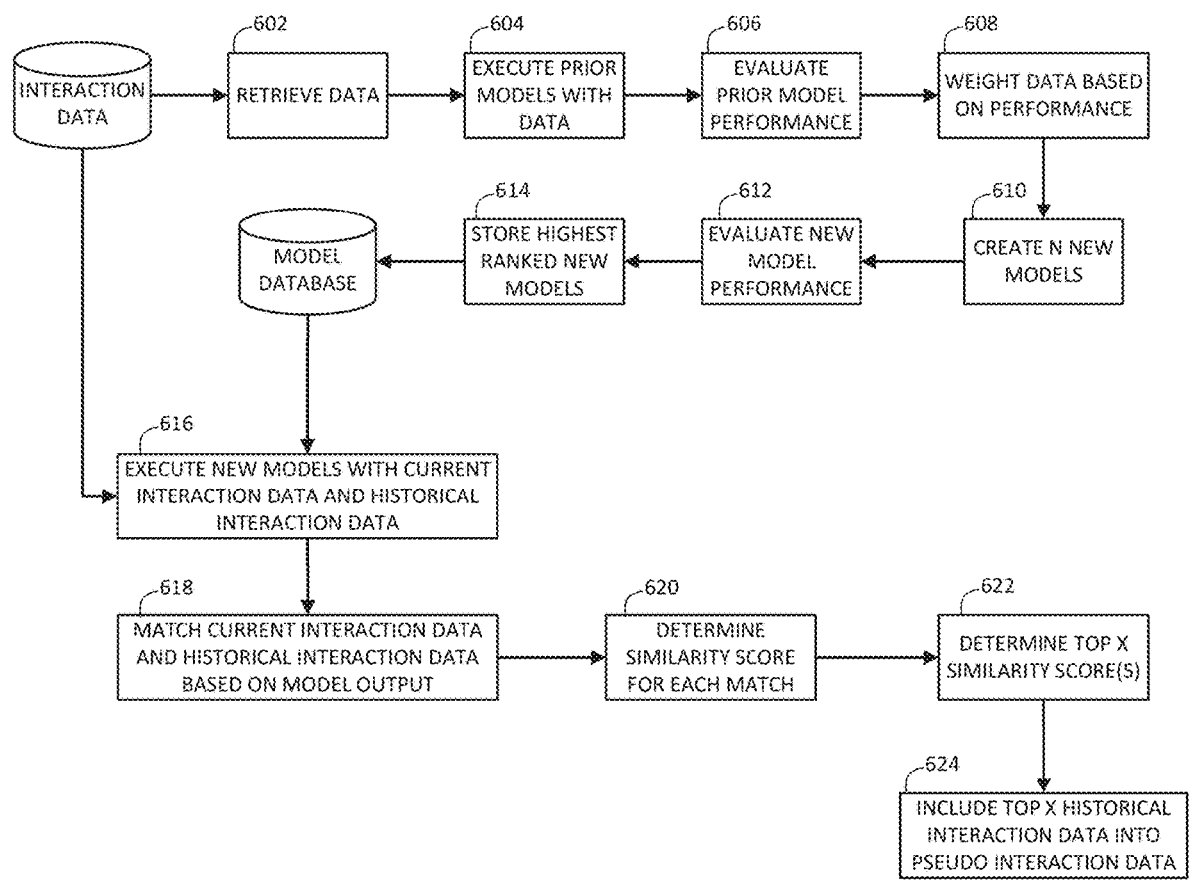
FIG. 6 shows an example flowchart illustrating a pseudo interaction data generation method according to some embodiments.

Further details regarding pseudo interaction data generation are discussed in reference to FIG. 6. As an overview of FIG. 6, described in detail herein, data can be derived from ensemble unsupervised deep learning models. Models can be generated with several different time windows. The data may be filtered by removing data that scored stably (the records appeared in similar cluster groups) within a prior predefined cutoff threshold. Using the ensemble of learners, cluster groups can be generated based on fraud trends from a predetermined time period (e.g., the past three weeks). The historical interaction data can be selected based on whether or not they are within same cluster group of recent interaction data. The historical interaction data can be filtered using, for example, a weighted information vector distance score (e.g., to determine which interactions of the historical interaction data are most similar to interactions of the current interaction data). The top matching historical interaction data can then be selected and, in some embodiments, be modified to align with current interaction data (e.g., editing the timestamps of the historical interaction data such that they fall within the current rolling window). The selected historical interaction data may be included as pseudo interaction data The data can then be added as fraudulent pseudo interactions when rebuilding the model. For example, if a particular community of IP address are strongly associated with a type of fraud patterns which are trending (e.g., currently occurring), the analysis computer can generate fraudulent pseudo interaction data using those IP addresses. An example of fraud may be transactional fraud, login fraud, spamming fraud, etc.

As an example, pseudo interaction data generated by the analysis computer may include a fraud pattern such as "nighttime network attacks originating from location A in English," which may be associated with 8 IP addresses. The fraud pattern may be determined via a community group which may include the 8 IP address associated with the fraud trend and may indicate that the IP addresses share a location code, a language code, etc. The 8 IP addresses may be associated with performing network attacks, where the fraud pattern may indicate that if one of the IP address begins a login attempt, typically the other 7 will soon also perform login attempts. This fraud trend can be useful to include into the current interaction data, as to not forget about the 8 IP addresses working together to perform fraud. Pseudo interaction data can include interaction data comprising login attempts which may have previously occurred by these 8 IP address. For example, the analysis computer can include the following 8 login attempts as pseudo interaction data: 1) [time: 23:10, host: www.example.com, location: A, language: English], 2) [23:11, www.example.com, A, English], 3) [23:12, www.example.com, A, English], 4) [23:12, www.example.com, A, English], 5) [23:12, www.example.com, A, English], 6) [23:13, www.example.com, A, English], 7) [23:13, www.example.com, A, English], and 8) [23:13, www.example.com, A, English]. It is understood, however, that the pseudo interaction data may include more, or fewer, data elements as illustrated in this example.

At step 414, after retrieving the interaction data occurring within the rolling window as well as generating the pseudo interaction data, the analysis computer can embed the interaction data for the interactions occurring within the rolling window and the pseudo interaction data to form interaction data matrices. Each column or row (depending on implementation) of the interaction data matrix can correspond to an interaction. In some embodiments, the analysis computer can embed the interaction data and the pseudo interaction data N times, once per each of the one or more error matrices determined at step 410. For example, the analysis computer can embed the interaction data using each of the one or more error matrices, and in some embodiments, one or more associated embedding neural networks. For example, the analysis computer can input the interaction data into an embedding neural network to embed the data. If steps 408-410 are not performed, then the analysis computer can embed the interaction data based on one error matrix, which may be predetermined.

As an illustrative example, for the interaction data relating to login attempts, the data from the http header packets can be embedded. For example, the IP address data can be embedded by splitting octets into separate columns. The browser type data can be embedded by splitting data components based on spaces. The forwarded data can be embedded by splitting the 'for' and 'to' IP addresses broken apart by octets. The host data can be embedded by splitting the domain name into components and natural language parsing where appropriate. The warning data can be embedded by splitting by spaces. However, it is understood that other embedding schemes may be determined and may not result in a one-to-one representation of the input data elements of the interaction data (e.g., the process of embedding may or may not convolute data elements of the input interaction data).

For example, a first IP address of "123.01.02.3456" can be represented by [123_01, 01_02, 02_3456, 123, 01, 02, 3456] (e.g., via Ngram). A second IP address of "123.01.02.9999" can be represented by [123_01, 01_02, 02_9999, 123, 01, 02, 9999]. For simplicity, the first IP address can be represented as [0, 1, 2, 3, 4, 5, 6], whereas the second IP address can be represented as [0, 1, 7, 3, 4, 5, 8]. Embedding these two IP addresses can be input as, for example, Embedding(9, 2, input_length=7). The first argument (9) can be the number of distinct entries or possible values (e.g., 0, 1, 2, 3, 4, 5, 6, 7, 8) in the training set (e.g., the first IP address and the second IP address). The second argument (2) can indicate the size of the embedding vectors (e.g., how long the output vector will be or the output—in this case, there would be 2 elements per output vector). The input_length argument can indicate the size (e.g., how many elements in the input vector) of each input sequence (e.g., vector). Once the network has been trained, the weights of the embedding layer may be obtained, which in this case will be of size (9, 2) (e.g., 9 elements per input vector and 2 elements per output vector) and can be illustrated as Table 1, below, which may be used to map inputs to embedding vectors.

TABLE 1

| Example Embedding | | |
|---|---|---|
| IP Address Component | Index | Embedding |
| 123_01 | 0 | [1.1, 3.4] |
| 01_02 | 1 | [1.2, 2.1] |
| 02_3456 | 2 | [0.9, 3.4] |
| 123 | 3 | [2.8, 2.8] |
| 01 | 4 | [0.7, 3.1] |
| 02 | 5 | [3.2, 2.0] |
| 3456 | 6 | [2.5, 1.2] |
| 02_9999 | 7 | [1.2, 4.0] |
| 9999 | 8 | [2.6, 1.5] |

In this example, the only difference between the first and second IP addresses is the last four digits. As shown in the table above, the output of the neural network can produce embeddings that are similar, despite the fact that the numbers themselves are very different. They four digits may share a common attribute such as they may be associated with different devices operated by the same person, connected to the same subnet. For example, in the table above, the IP address components "3456" and "9999" may respectively produce embeddings [2.5, 1.2] and [2.6, 1.5], and may indicate that they may share a common attribute. "3456" and "9999" may respectively designate a cell phone and a laptop computer associated with the same person using the same subnet, and the "same person" in this example may be the common attribute.

By using embeddings as inputs to a learning model, similar data may be reflected in the input data that is provided to the learning model (420, which is described in further detail below), so that the learning model is trained in a more accurate and efficient manner. Stated differently, the similar data may reflect some underlying meaning in the data, and that underlying meaning can be imparted to the subsequently used learning model.

The IP address component, index and corresponding embeddings of Table 1 illustrates an example embedding, however it is understood that any suitable output embeddings can be determined by the analysis computer. Further, the inputs can include the interaction data as a whole, rather than only the IP addresses in the above example.

At step 416, after embedding the data (e.g., the interaction data occurring within the rolling window as well as the pseudo interaction data), the analysis computer can determine a test sample and split the test sample from the rest of the data. For example, the analysis computer can separate 10%, 20%, 30%, 40%, 50%, etc. of the interaction data matrices. The analysis computer can separate a subgroup of the interaction data matrices to form the test sample. The analysis computer can separate the test sample in any suitable manner known to one of skill in the art. At step 418, the test sample may be stored in a test data database. The test sample may be separated from the training sample in order to later evaluate the model trained with the training sample.

At step 420, after storing the test sample, the analysis computer can then rebuild a deep learning model using the data. For example, the analysis computer can form a neural network model using the interaction data matrices. The analysis computer can form the neural network model in any suitable manner. The neural network can be a convolutional neural network, a recurrent neural network, etc. For example, in some embodiments, the analysis computer can build a deep learning model based on vectors of the interaction data matrices of interaction data (e.g., HTTP header packet data).

As an example, the analysis computer can train a neural network with the interaction data matrices of the interaction data matrices not included in the test sample. For example, each column or row (depending on implementation) of the interaction data matrix can correspond to an interaction vector. Each vector can be input into the neural network for training. Based on the training, the analysis computer can determine a plurality of neural network weights in part defining the neural network model. For example, the analysis computer can train the neural network as described in FIG. 3. The analysis computer can then evaluate the neural network model using the test sample. At step 422, the analysis computer can store the rebuilt deep learning model (e.g., the neural network model) in a candidates database.

At step 424, after storing the neural network model(s) in the candidates database, the analysis computer may evaluate the neural network model(s) in the candidates database using test data from the test data database. The analysis computer can evaluate a neural network model with the test data in any suitable manner. The analysis computer can input the test data into the neural network model to determine an output. For example, the analysis computer can input login attempt data. The neural network model can predict (e.g., classify) the input login attempt data as fraudulent or not fraudulent. In some embodiments, the analysis computer can determine if there is a shift in distribution and/or fit of the models.

At step 426, the analysis computer can determine whether or not the model is acceptable based on the evaluation. For example, the analysis computer can determine whether or not neural network model accurately predicted the input login attempt data as fraudulent or not fraudulent. The analysis computer can determine whether or not the model is acceptable based on the prediction accuracy of the model. For example, the analysis computer can determine that the model is acceptable, if the model accurately predicted 70%, 80%, 90%, 95%, 99%, etc. of the input login attempt data.

If the analysis computer determines that the model is not acceptable, then the analysis computer can discard a model that is not acceptable and end the process. In some embodiments, the analysis computer can repeat step 424-426 for each of the other models stored in the candidate database if other models are stored in the candidate database. If the analysis computer determines that the model is acceptable, then the analysis computer can proceed to step 428. At step 428, the analysis computer can store the neural network model in the current model database.

At any suitable time, at step 430, the analysis computer can receive a request message comprising request data. The analysis computer can receive the request message from any suitable external computer (e.g., the requesting client 114 of FIG. 1). In some embodiments, the request data can include new interaction data (e.g., a login attempt comprising a timestamp, an IP address, a host, etc.).

At step 432, after receiving the request message, the analysis computer can determine a response message to the request message. The response message can comprise response data output by the neural network model based on the request data. For example, the analysis computer can determine whether or not the new interaction data indicates a fraudulent login attempt. As another example, in some embodiments, the analysis computer can determine a prediction of whether or not one or more entities associated with one or more IP addresses will attempt a fraudulent login attempt.

At step 434, the analysis computer can transmit the response message to the requesting client. The requesting client, upon receiving the response message, can quickly be able to react to the fraudulent login attempt (if determined to be fraudulent by the analysis computer). By being able to more precisely predict fraudulent login attempts, network attacks can more efficiently and quickly be identified. Thus allowing attack mitigation strategies to be employed sooner and more pointedly towards the network attack.

C. Dynamic Embedding

FIG. 5 shows a dynamic embedding determination method according to some embodiments. In some embodiments, the method described in FIG. 5 may be performed by an analysis computer, as described herein. The dynamic embedding determination method can be performed at step 408 of FIG. 4. During the dynamic embedding process, the analysis computer can determine an optimal embedding for the interaction data. For example, during steps 502-518, the analysis computer can transform interaction data prior to inputting the data into a model to train and test the model. The transformation can be applied via, for example, an error matrix. The analysis computer can later redetermine the error matrix based on an evaluation of the performance of the model. In some embodiments, if the performance is poor (e.g., a high total error), the analysis computer can apply the error matrix of the model to the interaction data, then train and evaluate a next model. The analysis computer may repeat this process until the total error of a model's predictions exceeds a predetermined threshold. In which case, the error matrix of the model may be stored and later used to embed input data at step 414 of FIG. 4, since the error matrix is the optimal error matrix which may be applied to the input data such that a resulting model has low total error.

At step 502, the analysis computer can create an initial error matrix for the interaction data retrieved from an interaction data database (e.g., at steps 406 of FIG. 4). For example, the interaction data may be in a form of a graph comprising a plurality of nodes, the nodes connected via edges. The analysis computer can generate an initial error matrix which may include data elements of a predetermined value (e.g., 1). The initial error matrix may be of a size similar of that of the interaction data (e.g., a size of an adjacency matrix and/or a degree matrix). In some embodiments, the analysis computer can weight the data elements in the error matrix based on a timestamp associated with the data elements corresponding interaction. The data elements in the error matrix may be weighted by, for example, a linear degrading function based on the time of the corresponding interaction. In such a way, the analysis computer may weight the initial error matrix based on how long ago an interaction of the interaction data occurred.

As an illustrative example, the analysis computer may first embed the data utilizing an error matrix which may describe a current embedding strategy. Initially the analysis computer may not know the optimal error embedding strategy represented by an optimal error matrix. As such, the analysis computer may determine to create an initial error matrix where each element may be equal to a value of 1.

At step 504, after creating the initial error matrix, the analysis computer can split a portion of the interaction data into a test sample. For example, the analysis computer can split the interaction data into a first portion and a second portion. The first portion may be a test sample. The second portion may be a training sample. In some embodiments, the second portion may include more interaction data than the first portion. However, it is understood that any suitable percentage of the interaction data may be included into the first portion. At step 506, the analysis computer can store the test sample into a test sample database.

At step 508, after storing the test sample, the analysis computer can train one or more models with the interaction data. Specifically, the analysis computer can train the one or more models with the second portion (e.g., training sample) of the interaction data. The one or more models can include any suitable models, for example, in some embodiments, the one or more models can include a decision tree. The analysis computer can create the decision tree in part by gradient tree boosting using the training sample and a predefined target feature, as known to one of skill in the art. The predefined target feature can include any suitable target for the decision tree (e.g., determining whether or not input interaction data is fraudulent or not fraudulent).

At step 510, after training the one or more models, the analysis computer can evaluate the one or models with the test sample retrieved from the test sample database. For example, the analysis computer can input the interaction data of the test sample into a model. The model, for example, a decision tree, can determine whether or not input interaction data can be classified as "fraud" or "not fraud," or other suitable predefined target feature.

At step 512, after evaluating the one or more models with the test sample, the analysis computer can update the error matrix as well as determine a total error. The total error can be determined in any suitable manner. For example, in some embodiments, the total error can be a MSE (mean squared error). The error matrix can be updated based on the residuals from the evaluation of each input interaction data. For example, residuals in a statistical or machine learning model can include the differences between observed (e.g., observed fraudulent or not fraudulent login attempt) and predicted values (e.g., prediction of fraudulent or not fraudulent login attempt) of data. The residuals can be a diagnostic measure used when assessing the quality of the model. In some embodiments, the residuals may be referred to as errors. In some embodiments, the analysis computer can examine residuals in terms of their magnitude and/or whether they form a pattern.

As an example, a situation in which the residuals are all 0, the model predicts perfectly. The further residuals are from 0, the less accurate the model. In the case of linear regression, the greater the sum of squared residuals, the smaller the R-squared statistic, all else being equal. Where the average residual is not 0, it implies that the model may be systematically biased (i.e., consistently over-predicting or under-predicting). The situation in which the residuals contain patterns, the model may be qualitatively wrong, as it is failing to explain some property of the interaction data.

The elements of the error matrix can be updated based on the residuals associated with the corresponding interaction data. For example, the neural network may incorrectly predict fraudulent login attempt when provided an authentic login attempt. The elements of the error matrix which are associated with the authentic login attempt may be updated based on the residuals from the incorrect prediction of the authentic login attempt.

At step 514, after updating the error matrix and the total error, the analysis computer can determine whether or not the total error exceeds a predetermined threshold. The total error can exceed the threshold (e.g., be greater than or equal to, or less than or equal to depending on the metric of the threshold). If the analysis computer determines that the total error does not exceed (e.g., satisfy evaluation criteria), then the analysis computer can proceed to step 516, during which the analysis computer can transform the interaction data based on the evaluation. If the analysis computer determines that the total error exceeds the predetermined threshold, then the analysis computer can proceed to step 518.

At step 516, after determining that the total error of a model does not exceed the predetermined threshold, then the analysis computer can transform the interaction data using the error matrix. In this way, the residuals determined from the previous model can be used to modify the input interaction data. The analysis computer can then repeat steps 508-512 with the transformed interaction data. The analysis computer can perform steps 508-516 any suitable number of times until either the total error of the model exceeds the predetermined threshold at step 514, or until a maximum number of iterations have been performed. By transforming the input interaction data, the analysis computer can determine which error matrix most accurately embeds the input interaction data.

At step 518, the analysis computer can store the error matrix corresponding to the model which had a total error which exceeds the predetermined threshold at step 514. In some embodiments, the analysis computer can store one or more error matrices corresponding to one or more models which have total errors which exceed the predetermined threshold. In some embodiments, the analysis computer may also store the embedding neural network associated with the error matrix.

After storing the one or more error matrices (which may be the most optimal error matrices), the analysis computer can embed interaction data including current interaction data (e.g., interaction data occurring within the rolling window) and the pseudo interaction data, at step 414, utilizing at least one error matrix. For example, the error matrix may represent an optimal way to transform the input data (e.g., interaction data) such that a resulting model more accurately predicts a target variable (e.g., fraud) than other models trained from not transformed data.

D. Pseudo Interaction Data Generator

FIG. 6 shows a pseudo interaction data generation method according to some embodiments. In some embodiments, the method described in FIG. 6 may be performed by an analysis computer, as described herein. For example, in some embodiments, the analysis computer can determine one or more data trends in the historical interaction data comprising interactions that occur within and outside of the rolling window. The analysis computer can then generate a plurality of pseudo interactions based on the one or more data trends to form pseudo interaction data. In some embodiments, determining the one or more trends can also include clustering at least the historical interaction data into one or more community groups. Each community group of the one or more community groups may include data representing interactions with similar characteristics.

At step 602, the analysis computer can retrieve interaction data from an interaction data database. The analysis computer can retrieve historical interaction data, which may be stored in association with timestamps which may occur prior to a determined rolling window (e.g., at step 406 of FIG. 4). In some embodiments, the analysis computer can retrieve all historical interaction data. In other embodiments, the analysis computer can retrieve historical interaction data occurring within a plurality of historical rolling windows. Each of the historical rolling windows can be of a same size (e.g., 2 days, 1 week, etc.) as the rolling window of step 406. For example, the analysis computer can sample historical interaction data from 10 historical rolling windows. The plurality of historical rolling windows can allow the analysis computer to sample historical interaction data, and thus not perform data processing using all stored data which may be computationally expensive. In yet other embodiments, the analysis computer can apply weights to the historical interaction data of each of the historical rolling windows. For example, the analysis computer can weight more recent data more heavily. The analysis computer can weight the historical interaction data of the historical rolling windows to place an emphasis on older or new trends in the historical interaction data. In some embodiments, the analysis computer can run more than one prior models if the more than one prior models were created in previous iterations.

At step 604, after retrieving the historical interaction data, the analysis computer can execute previously created models with the historical interaction data as input. In some embodiments, the previously created models can include deep learners which may cluster data into community groups. For example, the analysis computer can execute a clustering model which can cluster the input historical interaction data. The analysis computer can cluster data points together which are characteristically similar. For example, a first interaction can be associated with interaction data comprising an IP address of "1234," a date of "01/01/2019," a time of "23:50," a browser of "browser_A," a host of "www.example.org." A second interaction can be associated with interaction data comprising an IP address of "2345," a date of "01/02/2019," a time of "23:55," a browser of "browser_A," a host of "www.example.org." The interaction data for the first interaction and the second interaction data may be clustered based on similar characteristics, for example, due to attempted fraud which occurred late at night targeting the same host and using similar browsers. However, it is understood that interaction data may be clustered based on any similarities.

At step 606, the analysis computer can evaluate the performance of the prior models. The analysis computer can evaluate the performance of the prior models using any suitable metric. For example, the analysis computer can determine a classification accuracy, a logarithmic loss, a confusion matrix, an area under curve (AUC), an F1 score, a mean absolute error, a mean squared error, etc. In some embodiments, the analysis computer can, using a vector distance score, determine which data (e.g., historical interaction data) and prior models are the most stable when executed with the historical interaction data. The analysis computer can determine a stability score for each prior model.

At step 608, after evaluating the performance of the prior models, the analysis computer can weight the historical interaction data based on the performance of the prior models. The analysis computer can weight the historical interaction data in any suitable manner. For example, in some embodiments, the analysis computer can weight the historical interaction data based on an inverse of the stability score.

For example, if the model performed well (e.g., predicted a target variable such as fraud accurately) then the analysis computer may weight the historical interaction data by a smaller amount than if the model performed poorly (e.g., did not predict a target variable such as fraud accurately). The historical interaction data may be weighted based on the performance of the model because, if the data has substantially changed from when the prior model was created, then the model will perform poorly and the data may be weighted in accordance with the change.

In some embodiments, after weighting the historical interaction data, the analysis computer can retrieve additional random samples of historical interaction data if additional historical interaction data is needed, for example as a test sample for evaluating (e.g., at step 612) the new models trained at step 610. In other embodiments, the test sample, may be a subset of the reweighted historical interaction data. The test sample may not be used for training a model, but may later be used to evaluate how well the model was trained.

At step 610, after weighting the historical interaction data, the analysis computer can create N new models. The N new models may include machine learning models (e.g., neural networks) trained on the weighted historical interaction data. The analysis computer can train the N new models in any suitable manner described herein.

At step 612, after training the N new models, the analysis computer can evaluate the performance of the N new models. The analysis computer can evaluate the performance of the N new models in any suitable manner as described herein. For example, the analysis computer can, utilizing the test sample, to determine a vector distance score to determine which models are the most stable for the test sample. In some embodiments, the analysis computer can determine how well the new model(s) performed in the same or similar way to the evaluation at step 606. For example, the analysis computer can determine how well the new model(s) predict a target variable such as fraud. A model which frequently receives authentic login attempt data but then predicts the data as being fraudulent may have poor performance.

At step 614, the analysis computer can store the new model(s) based on the performance of the new models determined at step 612. For example, in some embodiments, the analysis computer can sort the new models by stability score and select a top Y number of model(s) based on a pre-defined value of Y (e.g., 1, 2, 3, 10, etc.). The analysis computer can then store the highest ranked new model(s) in a model database. In future iterations of steps 602-614, the new models may be considered prior models. The analysis computer can store the new model(s) which perform best.

At step 616, the analysis computer can execute the new models with a dataset, as input, including the historical interaction data as well as the interaction data occurring within the rolling window (e.g., as retrieved at step 406). The analysis computer can execute the new models in any suitable manner as described herein. For example, to determine pseudo interaction data, the analysis computer may execute the models in the model database with the retrieved historical interaction data and the interaction data occurring within the rolling window. The analysis computer can determine which historical interaction data is similar to the current interaction data based on a criteria (e.g., being part of a trend as identified by determined community groups). The historical interaction data which is most similar in terms of, for example, shared community groups, can be included as pseudo interaction data to be used to train a machine learning model (e.g., at step 420). Steps 618-624 describe the determination and selection of the historical interaction data which can be included into pseudo interaction data.

At step 618, after executing the new models with the historical interaction data and the interaction data occurring within the rolling window, the analysis computer can match interaction data which occurs within the rolling window to historical interaction data. For example, the new model may cluster the data into community groups based on similarities between the data points. The analysis computer can determine if any of the interaction data occurring within the rolling window matches (e.g., over a threshold amount of similarity) any of the historical interaction data. For example, the analysis computer can determine a difference between community groups of data using a vector distance score (or any other suitable similarity metric).

At step 620, the analysis computer can determine similarity scores for each interaction data within matched community groups. For example, at step 618, a fraudulent historical interaction community group and a fraudulent current community group may be matched. The analysis computer can then, at step 620, determine a similarity score between each of the historical interaction data of the fraudulent historical interaction community group and each of the interaction data occurring within the rolling window of the fraudulent current community group. The similarity score can be any suitable similarity score as described herein. In some embodiments, the similarity score may be a vector distance score, which can be a distance in vector space between, for example, a fraudulent login attempt of the historical interaction data and a fraudulent login attempt of the current interaction data.

At steps 622 and 624, after determining similarity scores, the analysis computer can sort the interaction data based on similarity score and include the top X matched historical interaction data into pseudo interaction data. The top X matched historical interaction data can include the highest sorted (e.g., highest similarity score) historical interaction data. In other words, the analysis computer can include the historical interaction data which most closely matches trends in current interaction data into the pseudo interaction data. In some embodiments, the pseudo interaction data can include interactions in which fraud may have occurred (e.g., a fraudulent login attempt). Including these pseudo interactions into the interaction data used to train a machine learning model (e.g., at step 420) can introduce additional data to include trends which have occurred over time in the historical interaction data and continuing into the current interaction data. In such a way, the resulting trained model may not forget about these overarching trends in the historical interaction data when determining predictions, or other suitable machine learning model output.

III. Experimental Improvements

Embodiments, as described herein, are evaluated against a model which does not include the use of pseudo interaction data. The data set used as the interaction data includes the KDD network intrusion dataset from the Third International Knowledge Discovery and Data Mining Tools Competition, which was held in conjunction with KDD-99 The Fifth International Conference on Knowledge Discovery and Data Mining.

A. Data

The KDD network intrusion dataset was used to test the system and method according to embodiments. This is the data set used for The Third International Knowledge Discovery and Data Mining Tools Competition, which was held in conjunction with KDD-99 The Fifth International Conference on Knowledge Discovery and Data Mining. The dataset includes "bad" connections, called intrusions or attacks, and "good" normal connections (e.g., non-fraudulent connections). This database contains a standard set of data to be audited, which includes a wide variety of intrusions simulated in a military network environment. See http://kdd.ics.uci.edu/databases/kddcup99/kddcup99.html for the dataset.

B. Methodology

First, the analysis computer pulled a 30% sample of the "Bad" data and 10% sample of the "Good" data. Then the analysis computer ran an ensemble graph learner to create community groups based on the "Bad" data. From the graph model, "Bad" patterns were recommended using a vector distance score to find similar "Bad" patterns to ones found in the 30% sample to generate pseudo interaction data. Next, two models were generated, one using the 30% "Bad" and 10% good data, the second mixed simulated "Bad" attacks with 30% "Bad" data. Both models used a gradient boosted tree. For performance testing the analysis computer used a new 10% sample of both "Good" and "Bad".

C. Results

Table 2, below, illustrates the precision and recall of models implemented with a dataset which does not include pseudo interaction data and a dataset which does include pseudo interaction data. The precision can be determined as:

Precision=true positives/(true positives+false positives)

The recall can be determined as:

Recall=true positives/(true positives+false negatives)

TABLE 2

Experimental Results

| | Precision | Recall |
|---|---|---|
| Dataset with no pseudo interaction data | .63 | .47 |
| Dataset with pseudo interaction data | .72 | .69 |

Embodiments of the disclosure have a number of advantages. Table 2 illustrates an improvement in both precision and recall when utilizing pseudo interaction data as described herein over using no pseudo interaction data. As such, embodiments of the disclosure allow the analysis computer to utilize the pseudo interaction data to make more precise predictions of whether or not interaction data (e.g., login attempt data) is fraudulent. By being able to more precisely predict fraudulent login attempts, network attacks can more efficiently and quickly be identified. Thus allowing attack mitigation strategies to be employed sooner and more pointedly towards the network attack.

Embodiments of the disclosure have advantages over a case in which all of the data is used to train a model. For example, while one other option might be to use all of the historical data and all data within a current rolling window (e.g., current interaction data), using all of the historical interaction data and the current interaction data to train a neural network can take a long time since large amounts of data need to be processed. If the neural network takes too long to train, then it cannot react to, for example, network attacks which can occur on much smaller timescales.

Additionally, embodiments of the disclosure have advantages over a case in which only current data from a current rolling window is used to train a model. For example, a fraudster and a secure system can react to the actions of the other which can lead to situation involving game theory (e.g., a situation in which there is strategic interaction between rational decision-makers). The fraudster may perform fraudulent login attempts from a first geographic location. As a result the secure system may be changed such that login attempts originating from the first geographic location are scrutinized with more particularity than login attempts originating from other geographic locations. The fraudster can then change their strategy and can, for example, perform IP spoofing. The fraudster can modify the IP address such that it appears, to the secure system, that the login attempt originates from a second geographic location. Yet again, the secure system may be changed such that login attempts originating from the second geographic location are scrutinized with more particularity than other geographic locations. However, if the models implementing these changes (e.g., determining to scrutinize the particular geographic location) analyze current data, they can stop scrutinizing the login attempts from the first geographic location. Thus, simply being reactive to what the fraudster is currently doing.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   determining, by an analysis computer, a rolling window associated with interaction data for interactions that occur over time;
   retrieving, by the analysis computer, interaction data for interactions occurring in the rolling window;
   generating, by the analysis computer, pseudo interaction data based upon historical interaction data; and
   forming, by the analysis computer, a neural network model using the interaction data for interactions occurring within the rolling window and the pseudo interaction data, wherein the method further comprises:
   determining one or more error matrices; and
   embedding the interaction data for the interactions occurring within the rolling window and the pseudo interaction data with a machine learning model and the one or more error matrices to form interaction data matrices, and wherein forming the neural network model comprises using the interaction data matrices to form the neural network model, and wherein determining the one or more error matrices further comprises:
  training, by the analysis computer, a model using a first portion of the interaction data for the interactions occurring within the rolling window;
  evaluating, by the analysis computer, the model using a second portion of the interaction data for the interactions occurring within the rolling window;
  determining, by the analysis computer, an error matrix and a total error based on the evaluation;
  determining, by the analysis computer, whether or not the total error exceeds a predetermined error threshold; and
  if the total error exceeds the predetermined error threshold, storing, by the analysis computer, the error matrix in a database.

2. The method of claim 1, wherein the rolling window includes a range of times during which the interaction data occurs.

3. The method of claim 2, wherein generating the pseudo interaction data further comprises:
  determining, by the analysis computer, one or more data trends in the historical interaction data comprising interactions that occur within and outside of the rolling window; and
  generating, by the analysis computer, a plurality of pseudo interactions based on the one or more data trends to form the pseudo interaction data.

4. The method of claim 3, wherein determining the one or more data trends further comprises:
  clustering, by the analysis computer, at least the historical interaction data into one or more community groups, wherein each community group of the one or more community groups includes data representing interactions with similar characteristics.

5. The method of claim 4, wherein forming the neural network model further comprises:
  separating, by the analysis computer, a portion of the interaction data matrices to form a test sample;
  storing, by the analysis computer, the test sample into a database;
  training, by the analysis computer, a neural network with the interaction data matrices not included in the test sample;
  based on the training, determining, by the analysis computer, a plurality of neural network weights in part defining the neural network model;
  evaluating, by the analysis computer, the neural network model using the test sample; and
  based on the evaluating, storing, by the analysis computer, the neural network model in a model database.

6. The method of claim 5, wherein the neural network is a convolutional neural network or a recurrent neural network.

7. The method of claim 1 further comprising:
  storing, by the analysis computer, the neural network model in model database.

8. The method of claim 7 further comprising:
  receiving, by the analysis computer, a request message comprising request data; and
  determining, by the analysis computer, a response message to the request message, the response message comprising response data output by the neural network model based on the request data.

9. The method of claim 1, wherein the interaction data comprises payment transaction data.

10. An analysis computer comprising:
  a processor;
  a non-transitory computer-readable medium coupled to the processor, the computer-readable medium comprising code executable by the processor for implementing a method comprising:
  determining a rolling window associated with interaction data for interactions that occur over time;
  retrieving interaction data for interactions occurring in the rolling window; generating pseudo interaction data based upon historical interaction data; and
  forming a neural network model using the interaction data for interactions occurring within the rolling window and the pseudo interaction data, wherein the method further comprises:
  determining one or more error matrices; and
  embedding the interaction data for the interactions occurring within the rolling window and the pseudo interaction data with a machine learning model and the one or more error matrices to form interaction data matrices, and wherein forming the neural network model comprises using the interaction data matrices to form the neural network model, and
  wherein determining the one or more error matrices further comprises:
  training, by the analysis computer, a model using a first portion of the interaction data for the interactions occurring within the rolling window;
  evaluating, by the analysis computer, the model using a second portion of the interaction data for the interactions occurring within the rolling window;
  determining, by the analysis computer, an error matrix and a total error based on the evaluation;
  determining, by the analysis computer, whether or not the total error exceeds a predetermined error threshold; and
  if the total error exceeds the predetermined error threshold, storing, by the analysis computer, the error matrix in a database.

11. The analysis computer of claim 10 further comprising:
  a pseudo interaction data generation module coupled to the processor;
  an embedding module coupled to the processor; and
  a machine learning module coupled to the processor.

12. The analysis computer of claim 10, wherein generating the pseudo interaction data further comprises:
  determining one or more data trends in the historical interaction data comprising interactions that occur within and outside of the rolling window; and
  generating a plurality of pseudo interactions based on the one or more data trends to form the pseudo interaction data.

13. The analysis computer of claim 10, wherein the interaction data for interactions that occur over time comprise timestamps and entity identifiers, and wherein the pseudo interaction data for pseudo interactions comprise timestamps and entity identifiers.

14. The analysis computer of claim 10, wherein the interactions are login attempts and comprise timestamps, IP addresses, and browser types, wherein a login attempt occurs when an entity attempts to login to a secure webpage.

15. The analysis computer of claim 14, wherein generating the pseudo interaction data based upon historical interaction data further comprises:
  determining a community group of similar login attempts of historical interaction data, wherein the community group includes IP addresses typically associated with fraudulent login attempts; and
  generating the pseudo interaction data comprising at least IP addresses included in the community group.

16. The analysis computer of claim 10, wherein the method further comprises:

determining a prediction, using the neural network model, of whether or not one or more entities associated with one or more IP addresses will attempt a fraudulent login attempt.

17. The analysis computer of claim 10, wherein the method further comprises:

receiving, from a requesting client, a request message comprising request data, wherein the request data includes new interaction data;

determining, by the analysis computer, a response message to the request message, the response message comprising response data output by the neural network model based on the new interaction data; and providing the response message to the requesting client.

18. The analysis computer of claim 10, wherein the interaction data comprises payment transaction data.

\* \* \* \* \*